(12) United States Patent
Carbon et al.

(10) Patent No.: US 12,036,859 B2
(45) Date of Patent: Jul. 16, 2024

(54) ELECTRIC MACHINE COOLED BY A DIELECTRIC HEAT TRANSFER FLUID

(71) Applicants: RENAULT s.a.s., Boulogne-Billancourt (FR); NISSAN MOTOR CO., LTD., Yokohama (JP)

(72) Inventors: Alain Carbon, Carrieres sous Poissy (FR); Julien Borie, Guyancourt (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 751 days.

(21) Appl. No.: 17/253,996

(22) PCT Filed: May 27, 2019

(86) PCT No.: PCT/EP2019/063684
§ 371 (c)(1),
(2) Date: Dec. 18, 2020

(87) PCT Pub. No.: WO2019/243000
PCT Pub. Date: Dec. 26, 2019

(65) Prior Publication Data
US 2021/0268893 A1 Sep. 2, 2021

(30) Foreign Application Priority Data
Jun. 22, 2018 (FR) ..................... 18 55542

(51) Int. Cl.
*H02K 5/20* (2006.01)
*B60K 11/02* (2006.01)
(Continued)

(52) U.S. Cl.
CPC .............. *B60K 11/02* (2013.01); *H02K 5/203* (2021.01); *H02K 9/193* (2013.01); *H02K 2205/09* (2013.01)

(58) Field of Classification Search
CPC ............ H02K 9/197; H02K 9/19; H02K 9/26; H02K 9/193; H02K 5/20; H02K 5/203;
(Continued)

(56) References Cited

U.S. PATENT DOCUMENTS 1,666,005 A * 4/1928 Culp ....................... F01N 1/089
123/41.31
3,577,024 A * 5/1971 Inagaki .................... H02K 9/19
310/61
(Continued)

FOREIGN PATENT DOCUMENTS

FR 1 233 384 10/1960
FR 1 396 629 4/1965
(Continued)

OTHER PUBLICATIONS

International Search Report issued on Aug. 20, 2019 in PCT/EP2019/063684 filed on May 27, 2019, 2 pages.

*Primary Examiner* — Edgardo San Martin
(74) *Attorney, Agent, or Firm* — Oblon, McClelland, Maier & Neustadt, L.L.P.

(57) ABSTRACT

An electric machine for an electric or hybrid motor vehicle includes a cooling system suitable for spraying a dielectric heat transfer fluid onto active parts of the machine and a reservoir for collecting, by gravity, the fluid flowing through an orifice in a wall separating the active parts and the reservoir. The machine also includes, at the orifice, a flap attached to the wall and suitable for closing the orifice, a resilient device to open the flap under the effect of gravity on the liquid, and a non-return device to hold the flap closed when a force exerted on the fluid in the reservoir brings the liquid against the flap.

10 Claims, 4 Drawing Sheets

(51) Int. Cl.
  *H02K 9/19* (2006.01)
  *H02K 9/193* (2006.01)
(58) Field of Classification Search
  CPC ...... H02K 5/04; H02K 2205/09; B60K 11/02; F16K 15/14
  See application file for complete search history.

(56) References Cited

U.S. PATENT DOCUMENTS

| | | | | |
|---|---|---|---|---|
| 3,675,056 A | * | 7/1972 | Lenz | H02K 9/20 |
| | | | | 310/59 |
| 3,897,852 A | * | 8/1975 | Hoffman | F01N 1/22 |
| | | | | 239/533.14 |
| 4,669,279 A | * | 6/1987 | Maeda | H02K 9/20 |
| | | | | 62/505 |
| 6,065,297 A | | 5/2000 | Tischer et al. | |
| 6,065,564 A | * | 5/2000 | Uegane | F01N 1/165 |
| | | | | 181/237 |
| 6,637,449 B2 | * | 10/2003 | Nagai | F01N 1/166 |
| | | | | 137/315.16 |
| 7,426,979 B2 | * | 9/2008 | Nagai | F01N 1/166 |
| | | | | 181/254 |
| 8,434,323 B2 | * | 5/2013 | Welch | H02K 9/20 |
| | | | | 62/468 |
| 9,291,166 B2 | * | 3/2016 | De Larminat | F04D 25/082 |
| 9,291,167 B2 | * | 3/2016 | Schreiber | H02K 1/20 |
| 10,298,097 B2 | * | 5/2019 | Smaoui | H02K 9/20 |
| 10,680,489 B2 | * | 6/2020 | Decaux | H05K 7/20918 |
| 11,296,580 B2 | * | 4/2022 | Engström | H02K 11/25 |
| 2007/0107981 A1 | * | 5/2007 | Sicotte | F01N 1/22 |
| | | | | 181/237 |
| 2022/0126677 A1 | * | 4/2022 | Assaad | B60K 1/00 |

FOREIGN PATENT DOCUMENTS

| | | | | | |
|---|---|---|---|---|---|
| FR | 2977199 | A1 | * | 1/2013 | ............ B60K 11/02 |
| FR | 3061372 | A1 | * | 6/2018 | ............ H02K 9/19 |
| GB | 2 062 361 | A | | 5/1981 | |
| KR | 200447850 | Y1 | * | 2/2010 | |
| WO | WO-2018206890 | A1 | * | 11/2018 | ............ B60K 1/00 |

* cited by examiner

ELECTRIC MACHINE COOLED BY A DIELECTRIC HEAT TRANSFER FLUID

BACKGROUND

The present invention relates in general terms to the fields of electrotechnology and motor vehicles, and relates more specifically to an electric machine for an electric or hybrid motor vehicle.

Electric machines for electric or hybrid vehicles, and in particular the motors thereof providing a torque to the transmission system of such a vehicle, require a high-performance cooling system.

A known cooling system for an electric motor, such as that described in document CN201355790, serves to cool at least one part of the active parts of an electric motor using a dielectric heat transfer liquid of the oil type. A cooling circuit injects the liquid onto the upper part of the stator of the motor, the liquid flows by gravity towards the lower part of the stator and is collected via holes located in the bottom part of the motor, into a reservoir.

A cooling system of this kind has a drawback in certain motor architectures on an electric or hybrid vehicle. Indeed, when such a vehicle is moving, with such a system the liquid would move in the oil reservoir when the vehicle accelerates, brakes or turns, such that the liquid would move back up via the holes in the bottom part of the motor, and would drown part of the air gap between the rotor and the stator. This would lead to a loss of performance of the motor and emulsion of the liquid, which impairs good cooling of the motor and good lubrication of the bearings of the rotor shaft.

BRIEF SUMMARY

One of the aims of the invention is to remedy at least part of the drawbacks of the prior art by providing an electric machine, for an electric or hybrid motor vehicle, cooled by a dielectric heat transfer cooling liquid, which experiences no loss of performance due to the vehicle turning, accelerating or braking.

To that end, the invention proposes an electric machine for an electric or hybrid motor vehicle, comprising a casing that is able to protect the active parts of said electric machine, a cooling system comprising means for spraying a dielectric heat transfer cooling liquid onto at least one part of said active parts, a reservoir that is able to collect, by gravity, said cooling liquid flowing through at least one orifice of a wall separating said active parts and said reservoir, said machine being characterized in that it comprises, at the level of said at least one orifice, a flap fixed to said wall and able to close off said at least one orifice, an elastic means that is able to open said flap under the effect of the gravity of said cooling liquid, and a non-return means that is able to keep said flap closed when a force exerted on said cooling liquid in said reservoir causes said liquid to press against said flap.

By virtue of the invention, the cooling liquid does not rise back up into the casing, which would drown the rotor and create an emulsion. This protects the performance of the machine.

According to one advantageous feature of the invention, said flap, said elastic means and said non-return means consist of a single membrane made of elastic material attached on either side of said at least one orifice and in which said flap is made, the edges of the fixed portion of said membrane covering the edges of said flap, the edges of said flap forming a descent toward said reservoir.

This implementation of the invention has the advantage of being cost-effective and simple to manufacture.

Said membrane is preferably made of silicone, which has the advantage of being able to withstand high temperatures, and of having deformation as a mechanical characteristic.

Also advantageously, said membrane comprises concave outer edges that can be secured by elasticity on the edges of said at least one orifice. This makes the membrane simple to install since all that is necessary is to clip it on to the wall at the level of the flow orifices for the cooling liquid. Moreover, this installation requires no modification of an existing casing of a prior art electric machine.

Alternatively, said flap is arranged beneath said wall and has dimensions greater than those of said orifice, said anti-return means comprising a return spring fixed to a pivot connection connecting said flap to said wall. This alternative has the advantage that it can be used on large-dimension oil flow orifices, the flap being rigid in this alternative implementation.

Advantageously, in this alternative, said flap is fixed by said pivot connection to a frame fixed on the edges of said orifice to said wall by clips. This makes it possible to benefit from the invention without modifying the existing casing of a prior art electric machine.

BRIEF DESCRIPTION OF THE DRAWINGS

Preferably, said flap and said frame are made of plastic material, which has the advantage of being cost-effective to produce.

Other features and advantages will emerge upon reading about a preferred embodiment, which is described with reference to the figures, in which.

DETAILED DESCRIPTION

Figure 1:
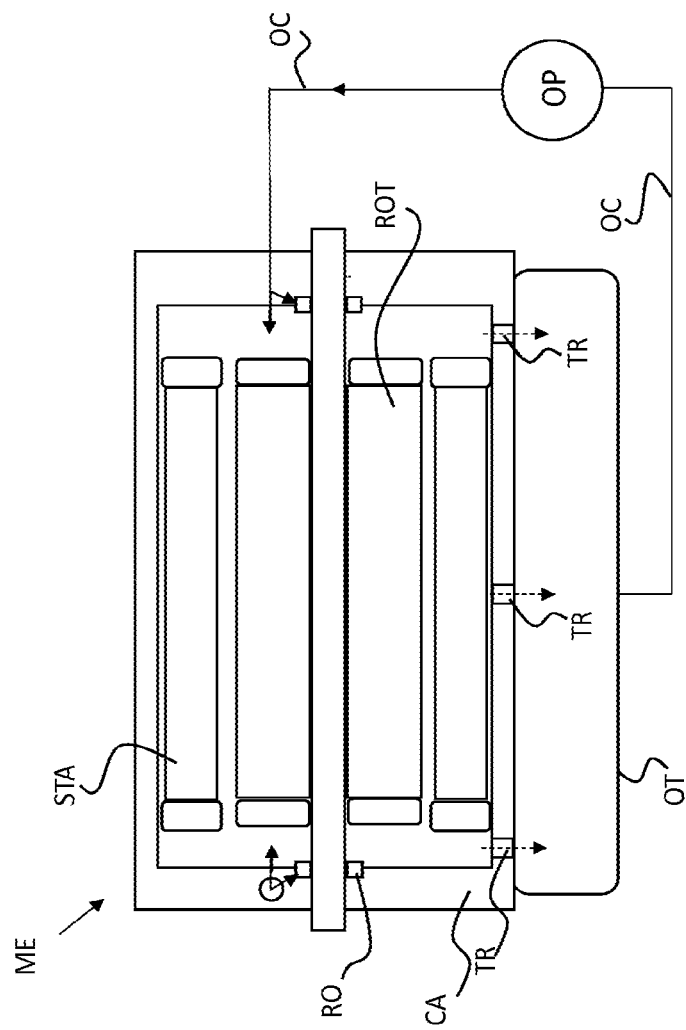
FIG. 1 depicts an electric machine according to the invention.

According to one preferred embodiment of the invention, shown in FIG. 1, an electric machine ME according to the invention comprises a casing CA that protects the active parts of the machine, such as its stator STA and its rotor ROT. The electric machine ME is intended to supply torque to the wheel of an electric or hybrid vehicle, and therefore requires a high-performance cooling system.

To that end, it comprises in particular a cooling circuit OC which is able to make oil circulate from an oil reservoir OT to the active parts of the electric machine ME, in this case to the rotor bundles. At an outlet of the oil circuit OC, the oil is sprayed by nozzles fixed in the planar walls of the casing CA, on either side of the electric machine ME, facing rotor bundles of the electric machine ME. Other nozzles at an outlet of the oil circuit OC spray the oil onto the bearings RO of the rotor shaft, these bearings being fixed in receptacles of each of the planar walls of the casing CA, on either side of the electric machine ME.

The oil sprayed by these various nozzles flows by gravity to the bottom part of the electric machine ME, then through holes TR located in the lower wall of the casing CA, into the oil reservoir OT. A pump OP positioned on the cooling circuit OC draws the oil from the oil reservoir OT and sends it back to the active parts of the electric machine ME. In this embodiment of the invention, three flow orifices TR are distributed regularly over the lower wall of the casing CA, but in a variant a single central flow orifice TR is used, which reduces the risk of oil rising back up.

Figure 2:
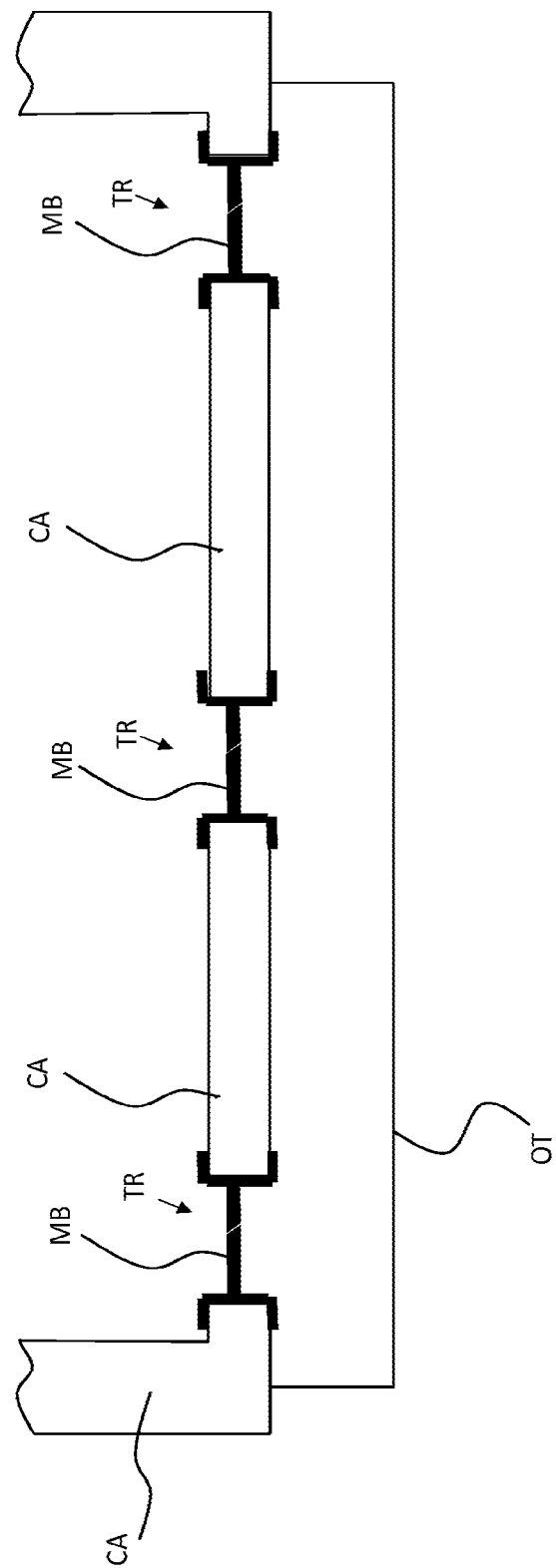
FIG. 2 depicts in detail the bottom part of the electric machine of FIG. 1.
Figure 3:
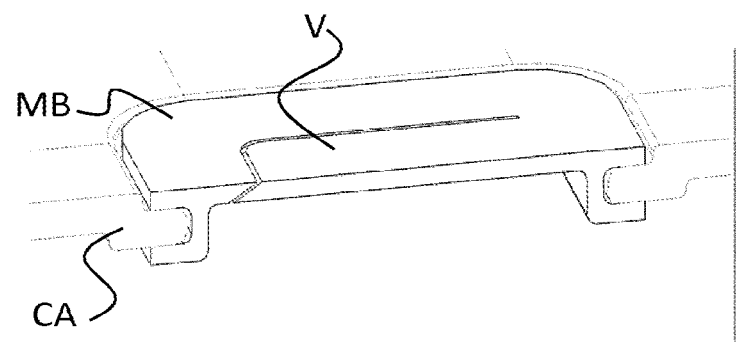
FIG. 3 depicts in section a membrane used in said bottom part.
Figure 4:
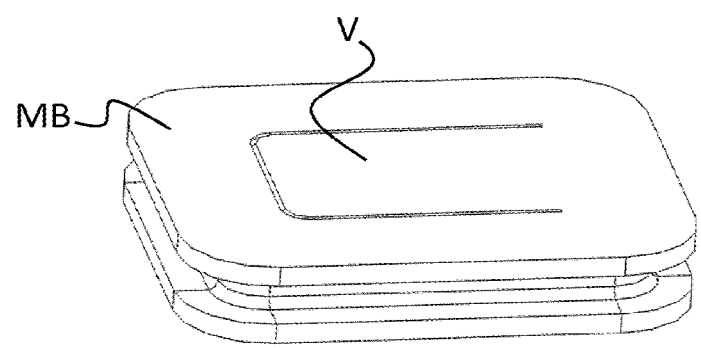
FIG. 4 depicts a view in relief of said membrane.

In order to prevent the oil from rising back up into the air gap of the electric machine ME, membranes MB, shown in FIG. 2, close off the orifices TR while allowing the oil to flow through the membranes MB. One of these membranes MB, made of a flexible material such as silicone or any equivalent material that can withstand temperatures of between −40° C. (degrees Celsius) and 120° C., is shown in detail in FIGS. 3 and 4. It comprises a flexible flap V which droops towards the oil reservoir OT under the weight of the oil which flows from the active parts of the electric machine ME. The flap V is made by creating a cut in the membrane MB, or by molding at the same time as the membrane MB. In the vertical direction with respect to the electric machine ME, that is to say in the direction of flow of the oil during normal operation, the cross section of the flap is oblique. Thus, the edges of the flap V form a slope that allows the oil to flow into the reservoir, but are immobilized against the corresponding edges of the rest of the membrane MB when the oil is pressed against the membrane MB from the oil reservoir OT, which prevents it from rising back up into the air gap. As a variant, the edges of the flap V are not made as a regular bevel but form a more irregular descent, for example a stepped descent, to the reservoir OT. The membrane MB further comprises rail-shaped edges by means of which it can be clipped onto the edges of the wall of the casing CA at the orifices TR.

Figure 5:
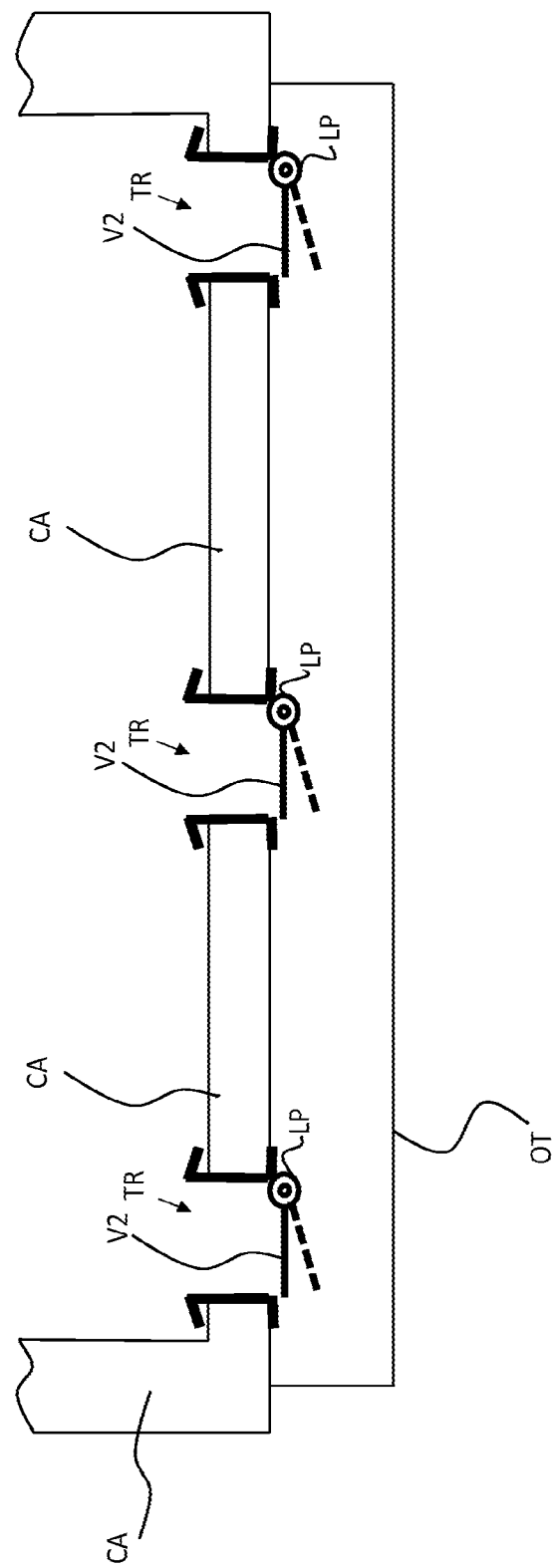
FIG. 5 depicts a variant embodiment of the invention, in detail and in the bottom part of an electric machine according to the invention.

According to one alternative embodiment, shown in FIG. 5, a plastic frame is clipped onto the edges of the orifices TR. A rigid flap V2, also made of plastic, is fixed by means of a pivot connection LP on an edge of the frame located in the reservoir. The plastic used for the flap V2 and the frame is able to withstand a temperature of between −40° C. and 120° C. An adjustable return spring serves to keep the flap V2 in contact with the frame. Said spring is coiled around a central rod, said rod connects the flap and the frame by means of a hinge connection.

Thus, the return spring allows the flap V2 to open and the oil to pass into the reservoir OT when this oil flows from the active parts of the machine ME, when the vehicle is driving at a constant speed on a straight road. The dimensions of the flap V2 are greater than those of the orifice TR, and thus in the event of turning or an abrupt acceleration/deceleration, the oil contained in the reservoir OT presses against the flap V2 which is immobilized by the edges of the wall of the casing CA and prevents the oil from rising back up into the air gap.

Other variant embodiments of the invention are of course conceivable, for example it is possible to use a dielectric heat transfer cooling liquid other than oil.

The invention claimed is:

1. An electric machine for an electric or hybrid motor vehicle, comprising:
   a casing that is configured to protect the active parts of said electric machine;
   a cooling system comprising means for spraying a dielectric heat transfer cooling liquid onto at least one part of said active parts, a reservoir that is configured to collect, by gravity, said cooling liquid flowing through at least one orifice of a bottom wall of said casing, the bottom wall separating said active parts and said reservoir,
   wherein said machine comprises, at the level of said at least one orifice, a flap fixed directly to said bottom wall and configured to close off said at least one orifice, an elastic means that is configured to open said flap under the effect of the gravity of said cooling liquid, and a non-return means that is configured to keep said flap closed when a force exerted on said cooling liquid in said reservoir causes said liquid to press against said flap.

2. The electric machine as claimed in claim 1, wherein said flap, said elastic means, and said non-return means consist of a single membrane made of elastic material attached on either side of said at least one orifice and in which said flap is made, the edges of the fixed portion of said membrane covering the edges of said flap, the edges of said flap forming a descent toward said reservoir.

3. The electric machine as claimed in claim 2, wherein said membrane is made of silicone.

4. The electric machine as claimed in claim 2, wherein said membrane comprises concave outer edges that can be secured by elasticity on the edges of said at least one orifice.

5. The electric machine as claimed in claim 1, wherein said flap is arranged beneath said bottom wall and has dimensions greater than those of said orifice, said anti-return means comprising a return spring fixed to a pivot connection connecting said flap to said bottom wall.

6. The electric machine as claimed in claim 5, wherein said flap is fixed by said pivot connection to a frame fixed on the edges of said orifice to said bottom wall by clips.

7. The electric machine as claimed in claim 6, wherein said flap and said frame are made of plastic material.

8. An electric machine for an electric or hybrid motor vehicle, comprising:
   a casing that is configured to protect the active parts of said electric machine;
   a cooling system comprising means for spraying a dielectric heat transfer cooling liquid onto at least one part of said active parts, a reservoir that is configured to collect, by gravity, said cooling liquid flowing through at least one orifice of a wall separating said active parts and said reservoir,
   wherein said machine comprises, at the level of said at least one orifice, a flap fixed to said wall and configured to close off said at least one orifice, an elastic means that is configured to open said flap under the effect of the gravity of said cooling liquid, and a non-return means that is configured to keep said flap closed when a force exerted on said cooling liquid in said reservoir causes said liquid to press against said flap, and
   wherein said flap, said elastic means, and said non-return means consist of a single membrane made of elastic material attached on either side of said at least one orifice and in which said flap is made, the edges of the fixed portion of said membrane covering the edges of said flap, the edges of said flap forming a descent toward said reservoir.

9. The electric machine as claimed in claim 8, wherein said membrane is made of silicone.

10. The electric machine as claimed in claim 8, wherein said membrane comprises concave outer edges that can be secured by elasticity on the edges of said at least one orifice.

* * * * *